United States Patent [19]

Canfield

[11] 4,335,522
[45] Jun. 22, 1982

[54] UP, DOWN OR HORIZONTAL PLUMB BOB

[75] Inventor: Robert L. Canfield, Colorado Springs, Colo.

[73] Assignee: Canfield Corporation, Colorado Springs, Colo.

[21] Appl. No.: 237,608

[22] Filed: Feb. 24, 1981

Related U.S. Application Data

[63] Continuation-in-part of Ser. No. 816,208, Jul. 15, 1977, abandoned, which is a continuation-in-part of Ser. No. 775,294, Mar. 7, 1977, abandoned.

[51] Int. Cl.³ .............................................. G01C 15/10
[52] U.S. Cl. ...................................... 33/353; 33/369; 33/392
[58] Field of Search ................. 33/353, 369, 377, 378, 33/392–394

[56] References Cited

U.S. PATENT DOCUMENTS

| 2,113,993 | 4/1938 | McLaughlin | 33/353 |
| 2,637,912 | 5/1953 | Baldwin | 33/369 |
| 3,789,512 | 2/1974 | Gros | 33/393 |

Primary Examiner—Charles E. Phillips
Attorney, Agent, or Firm—Dayton R. Stemple

[57] ABSTRACT

A transparent plumb bob having a fixed point and an associated movable point, to be aligned therewith for determination of a vertical line through a given exterior point, optionally including means for horizontal leveling and easily securing the bob intermediate the ends of a string. A vertical or horizontal line is determined by fixing one string end to a point spaced from the plumb bob and then pivoting the plumb bob and other string end about the point until the associated indicators are in alignment.

14 Claims, 5 Drawing Figures

U.S. Patent  Jun. 22, 1982  4,335,522
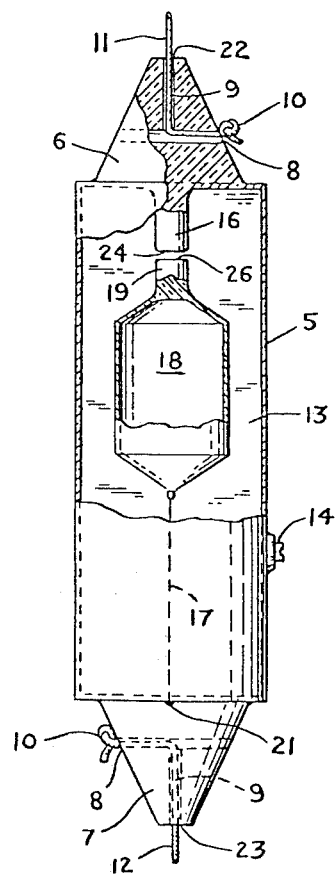
FIG. 1
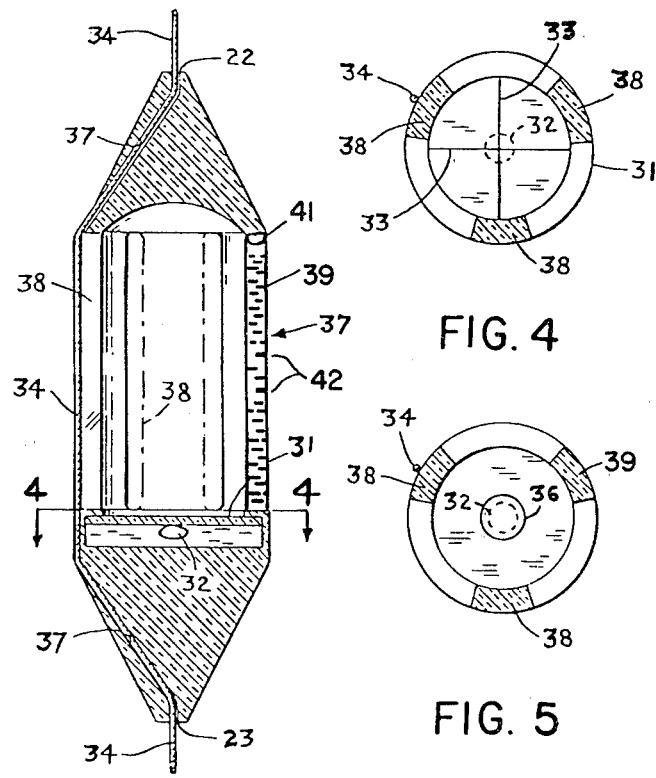
FIG. 3
FIG. 4
FIG. 5
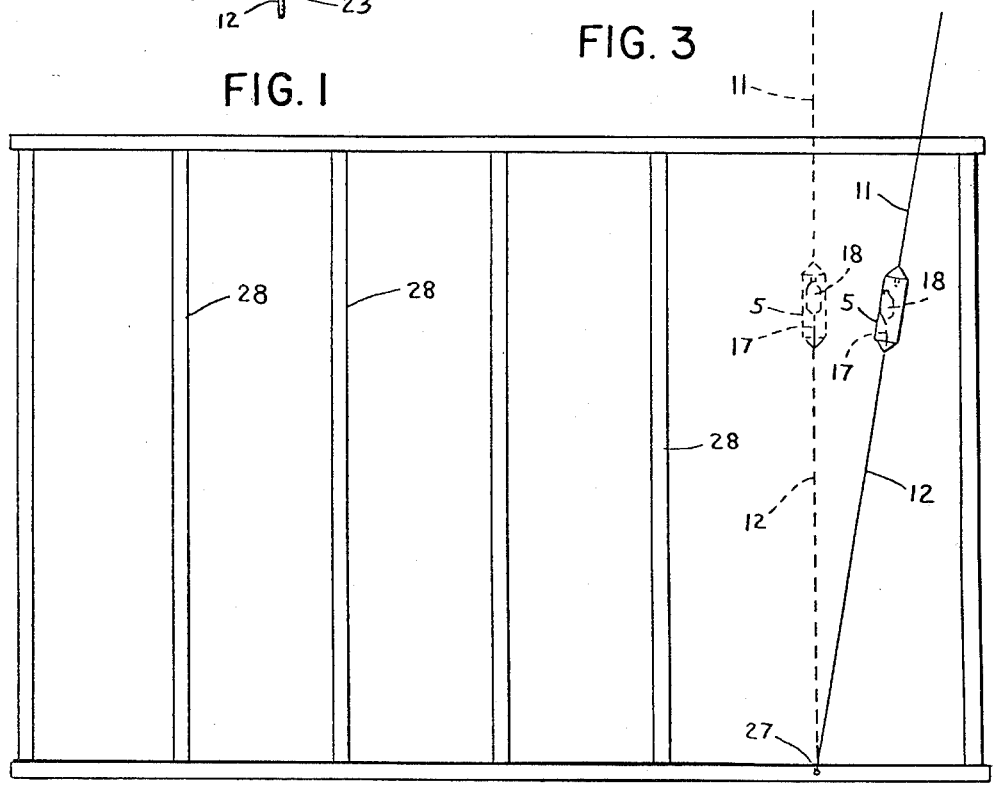
FIG. 2

UP, DOWN OR HORIZONTAL PLUMB BOB

SUMMARY OF INVENTION

This is a continuation-in-part of co-pending application, Ser. No. 816,208 filed July 15, 1977, which was a continuation-in-part of Ser. No. 775,294 filed Mar. 7, 1977 both now abandoned.

This invention relates to new and useful improvements in a plumb bob (a device for establishing an absolute vertical line) and more particularly seeks to provide an easily readable, light unit which is slidably strung from both its ends, can be utilized to determine a plumb line from a point either above or below the plumb bob, and optionally can be used as a horizontal level.

PRIOR ART

As a general rule, plumb bobs comprise a long string with relatively heavy weight attached to one end so that the operator can plumb only from a point above the heavy weight. There are many leveling devices which may have strings on either side for determining a level horizontal line, but plumb bobs for determining vertical lines generally have only strings attached to one end, and even if strings were attached to both ends it still would not permit the establishment of a vertical line from a point below the plumb bob.

OBJECTS OF THE INVENTION

It is an object of this invention to provide a plumb bob secured between string ends which permits the operator to easily plumb from a point either above or below the bob.

It is another object of this invention to provide such a device where the string may be readily attached to, or detached from, the bob.

It is also an object of this invention to provide such a device where the bob is easily slidably mounted to any point on or off the string.

It is added object of this invention to provide a plurality of vertical indicators that may be used on the bob.

It is likewise an object of this invention to optionally provide a combination device that can be used for either plumbing or leveling.

It is a further object of this invention to provide such a device that is readily readable to the operator.

With these and other objects, the nature of which will be apparent, the invention will be more fully understood by reference to the drawings, the accompanying detailed description and the appended claims.

BRIEF DESCRIPTION OF THE DRAWINGS

FIG. 1 is a vertical section of a plumb bob constructed in accordance with this invention;

FIG. 2 shows a device when using same to establish a vertical line from a point below the plumb bob;

FIG. 3 is a vertical section through a modified plumb bob;

FIG. 4 is a horizontal section on line 4–4 of FIG. 3; and

FIG. 5 is a horizontal section similar to FIG. 4 but through a modified circular level.

DESCRIPTION OF THE PREFERRED EMBODIMENT

Referring to the drawings in detail, the invention as illustrated is embodied in a transparent plastic unit housing fixed and movable indicators that align with each other to determine an exact vertical line by way of a taut string easily secured to the device so as to extend the vertical line as far as necessary.

The plumb bob 5 shown in FIG. 1 has a top conical end 6 and a bottom conical end 7, both ends having a horizontal channel 8 which is intersected by an exactly centered vertical channel 9 within which is attached an upper string 11 and a lower string 12 by knot 10. Upper string 11 acts as if it were secured at point 22 whereas lower string 12 acts as if it were secured at point 23.

Between the respective ends is a chamber 13 filled with water, light oil, alcohol, antifreeze or some similar liquid that remains fluid in the environment where the bob is being used. A threaded plug 14 is provided for placing liquid into chamber 13.

Protruding downwardly from the exact center of the top of the chamber is a fixed indicator 16 which is about ⅛" in diameter and ¾" long to define a center point 24. From the exact center point 21 of the bottom surface of the chamber extending upwardly is a fine monofilament line 17 attached to a plastic bubble 18, having at the top end thereof a floating indicator 19 with the same diameter as, and spaced about 1/32" from, indicator 16 when extending upwardly as far as allowed by filament 17. Indicator 19 defines a point 26. The plastic bubble is filled with air and therefore floats upwardly in the chamber 13 that is filled, or at least to ¼" from the top, with a liquid within which the bubble moves readily.

The bubble floating in liquid always maintains a perpendicular position. Points 22, 24, 21 and 23 are always in alignment with each other. However, the entire unit must be in a perpendicular position to secure alignment of these points with point 26 of the floating bubble 18. Since point 26 is the only point moving relative to the others, it can be read relative to any of the others, but fixed point 24 is the closest, easiest and simplest to read.

This unit establishes an absolute vertical line because of the floating condition of bubble 18 within the fluid of chamber 13. If the unit were turned upside down, it would also operate successfully if the bubble 18 were heavier than the chamber 13 fluid. Thus if bubble 18 were filled with mercury or formed with lead and the chamber fluid was oil or water, the same principle would apply. In fact, if the chamber fluid is air, then most any weighted material for the bubble (being heavier than air) will operate in the upside down position.

A further modification is shown in FIG. 3. Here, in a somewhat different bob 37 the bubble and chamber fluid have been replaced by a circular level 31 which is mounted to be exactly perpendicular to the line between 22, 23. An air bubble 32 is centered in the level 31 when level to indicate the bob is vertical. Centering of the air bubble is visually aided by cross lines 33 as shown in FIG. 4 or the centered circle 36 shown in FIG. 5. Since the fluid chamber in level 31 is much smaller than chamber 13, the bob can be made with elongated struts 38, 39 if desired, as long as the level is perpendicular to an imaginary line between cone ends 22, 23.

Another modification is shown in FIG. 3. One or more of the struts 39 may be hollow, transparent, and filled with a liquid except for an air bubble 41 that is located between marks 42, 42 when the struts 38, 39 are in a horizontal level position. With this construction, the bob 37 may be used as a level per se or the string 34 when taut may be used to determine if two widely spaced points are level with each other.

FIG. 1 shows a pair of strings 11, 12. However, a single string 34 may be strung as shown in FIG. 3. Instead of being knotted at 10, the single string continues from the top cone at point 22, through slanting channel 37 along the bob side, then through slanting channel 37 at the bottom to point 23 and then downward for an indefinite length. With this modification, the bob may obviously be slidably placed anywhere between or at ends of single string 34. When the string 34 is taut, it will not effect correct reading of the device. A single string can be used on FIG. 1 or 3, and if it becomes too loose, knots may be tied or wedges placed in the channels.

Obviously, this device will be useful to construction workers, surveyors and anyone having a need to establish an absolute vertical or horizontal line.

I claim:

1. A plumb bob comprising an elongated body having top and bottom ends, spaced apart by a plurality of elongated parallel struts, at least one strut being hollow, transparent and filled with liquid except for an air bubble that acts as a horizontal level indicator, a transparent fluid chamber between said body ends, means for securing a string at a point on each body end, a fixed indicator point intermediate and in alignment with said body end points, and an associated movable level indicator within said chamber of different density than said fluid, said points describing an imaginary straight line, said movable level indicator being aligned with said fixed indicator point only when said imaginary line is vertical.

2. The plumb bob of claim 1 wherein all said points are centered relative to the diameter of said body.

3. The plumb bob of claim 1 wherein said body is made from a transparent plastic.

4. The plumb bob of claim 1 wherein said ends are conical.

5. The plumb bob of claim 1 wherein said fluid has a lesser density than said indicator.

6. The plumb bob of claim 1 wherein said fluid has a greater density than said indicator.

7. The plumb bob of claim 6 wherein said fluid is liquid and said indicator is gas.

8. The plumb bob of claim 7 wherein said indicator is a gas bubble.

9. The plumb bob of claim 8 wherein said gas bubble is an elongated hollow gas-filled plastic member.

10. The plumb bob of claim 1 wherein said string securing means is a channel through which said string may be threaded.

11. The plumb bob of claim 10 wherein said string securing means includes at each body end a horizontal channel spaced from the end and a vertical channel intersecting and extending from the horizontal channel to the respectve end.

12. The plumb bob of claim 11 additionally including a string at each end extending through said channels, knotted at the free end of said horizontal channel and extending through and beyond said respective end.

13. The plumb bob of claim 10 wherein said string securing means includes at each body end a slanting channel extending from said end to a position on the side wall of said body.

14. The plumb bob of claim 13 additionally including a string extending through and beyond both said ends, through said slanting channels and along said wall between said slanting channels.

* * * * *